United States Patent

Avery

[11] 3,937,300
[45] Feb. 10, 1976

[54] REPLACEABLE LUBRICATING CARTRIDGE FOR SPLINE CONNECTIONS

[75] Inventor: Bennett W. Avery, Peoria, Ill.

[73] Assignee: Caterpillar Tractor Co., Peoria, Ill.

[22] Filed: June 26, 1974

[21] Appl. No.: 483,163

Related U.S. Application Data

[62] Division of Ser. No. 390,877, Aug. 23, 1973, Pat. No. 3,847,248.

[52] U.S. Cl. .............. 184/70; 184/6.12; 206/384; 215/6; 220/20
[51] Int. Cl.² .................................. F16N 9/02
[58] Field of Search ........ 184/14, 15 R, 15 A, 15 B, 184/1 R, 6.11, 31, 88 R, 88 A, 70, 65, 66; 60/39.08; 220/20, 23; 206/384, 437; 222/215, 107, 541; 272/8 R, 8 N, 27 N; 215/6, 11 R, 11 E, 12 R

[56] References Cited
UNITED STATES PATENTS

| | | | |
|---|---|---|---|
| 315,128 | 4/1885 | Crane | 184/65 |
| 378,752 | 2/1888 | Ader | 215/6 |
| 467,727 | 1/1892 | Schon | 215/6 |
| 815,883 | 3/1906 | Van Blarcom | 215/6 |
| 978,892 | 12/1910 | Janssen | 215/12 R X |
| 1,166,806 | 1/1916 | Aronson | 215/6 |
| 1,296,943 | 3/1919 | Fraser | 184/88 R |
| 1,320,414 | 11/1919 | Rohr | 184/88 R |
| 1,376,265 | 4/1921 | Fraley | 184/70 |
| 2,113,848 | 4/1938 | Lui | 215/12 R |
| 2,668,086 | 2/1954 | Marzolf | 184/14 X |
| 2,731,013 | 1/1956 | Holmes | 215/6 X |
| 2,753,990 | 7/1956 | Chalfin et al. | 215/6 X |
| 2,877,063 | 3/1959 | Janiszewksi | 184/1 R X |
| 3,325,088 | 6/1967 | Keen et al. | 60/39.08 UX |
| 3,469,655 | 9/1969 | Moreno | 184/1 D |
| 3,605,947 | 9/1971 | Salerno et al. | 184/15 R |
| 3,621,937 | 11/1971 | Edge et al. | 184/6.11 |
| 3,635,470 | 1/1972 | McMillan | 272/27 N |

FOREIGN PATENTS OR APPLICATIONS

| | | | |
|---|---|---|---|
| 122,866 | 5/1931 | Austria | 184/1 R |
| 518,297 | 3/1953 | Belgium | 184/1 R |
| 63 | 1/1894 | United Kingdom | 184/1 R |

Primary Examiner—Richard C. Pinkham
Assistant Examiner—Arnold W. Kramer
Attorney, Agent, or Firm—Phillips, Moore, Weissenberger Lempio & Strabala

[57] ABSTRACT

A replaceable lubricating cartridge, adapted for installation in the end of a hollow rotating shaft, gear or the like, comprises a housing having an outer annular wall with a first end closed by an end wall and the other end partially closed by a first and second partition. The first partition forming with the housing a first closed chamber portion therein and the second partition forming with the housing a substantially closed second chamber portion therein adapted to be filled with liquid lubricant. An opening through the second partition permits the lubricant to be expelled as needed.

3 Claims, 2 Drawing Figures

REPLACEABLE LUBRICATING CARTRIDGE FOR SPLINE CONNECTIONS

CROSS REFERENCE TO RELATED APPLICATION

This application is a division of U.S. application Ser. No. 390,877, filed on Aug. 23, 1973 and now U.S. Pat. No. 3,847,248, issued on Nov. 12, 1974.

BACKGROUND OF THE INVENTION

Spline connections are prone to fretting corrosion due to relative movements which occur between the members which are splined together. Unsealed and non-lubricated spline connections are subjected to additional fretting corrosion due to the creation of ferric oxide therein. Prior art methods and devices employed for lubricating such spline connections are exemplified by U.S. Pat. Nos. 3,380,555 and 3,621,937 and U.S. Pat. application Ser. No. 244,213, filed on Apr. 14, 1972 by Samuel I. Caldwell et al. for "Lubrication System for a Gear Drive Mechanism." Such application is assigned to the assignee of this application.

SUMMARY OF THIS INVENTION

An object of this invention is to provide an improved means for economically and efficiently lubricating a spline connection. Such means comprises a replaceable lubricating cartridge, adapted for installation on the end of a shaft or gear, comprising a housing which defines an annular chamber therein. Partition means, secured to the housing to separate the annular chamber into a closed first chamber portion and a second chamber portion, has means defining an opening therethrough adapted to communicate lubricant from the second chamber portion to such spline connection.

BRIEF DESCRIPTION OF THE DRAWINGS

Further objects of this invention will become apparent from the following description and accompanying drawing wherein.

DETAILED DESCRIPTION

Figure 1:
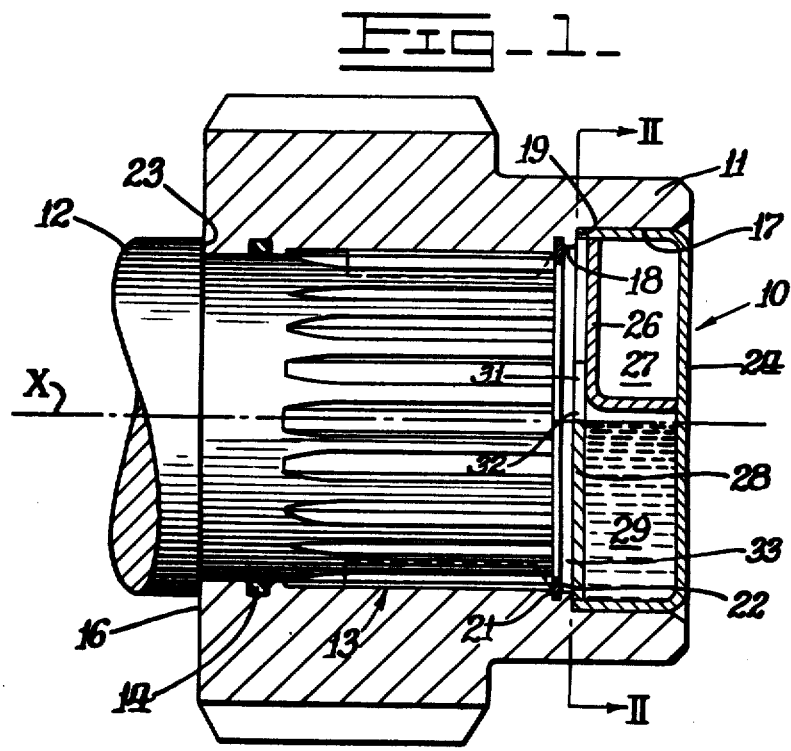
FIG. 1 is a longitudinal sectional view of a spline connection having a replaceable lubricating cartridge embodying this invention mounted thereon.

The drawing illustrates a replaceable lubricating cartridge 10 in association with a pinion gear 11, releasably attached to the end of a shaft 12 by a spline connection 13. Although the cartridge is shown in such association, it should be understood that it is well adapted for the lubrication of other types of mechanisms, as will be appreciated by those versed in the art. An O-ring seal 14 is disposed between the shaft and the gear, adjacent to a face 16 thereof, to seal the spline connection at its inboard end.

A pair of concentric bores 17 and 18 extend axially inwardly in stepped-down relationship with respect to each other from an outer face of the gear. Outer bore 17 terminates at an annular shoulder 19 whereas an annular groove 21 is formed in inner bore 18 to mount a standard snap ring 22 therein. An annular shoulder 23, formed on the shaft to abut face 16 of the gear, cooperates with the snap ring to properly locate and to secure the gear on the shaft.

Cartridge 10 comprises a cup-shaped housing 24 having its annular outer wall press-fitted or otherwise suitably secured in bore 17 to abut annular shoulder 19. The housing is closed by an end wall on its outboard side and has partition means secured in an annular chamber thereof to separate the chamber into first and second chamber portions. The partition means comprises a crescent-shaped member 26, having a generally L-shaped cross section, which forms a closed and sealed first chamber portion 27 preferably having a volume less than half of the total volume of the chamber.

Figure 2:
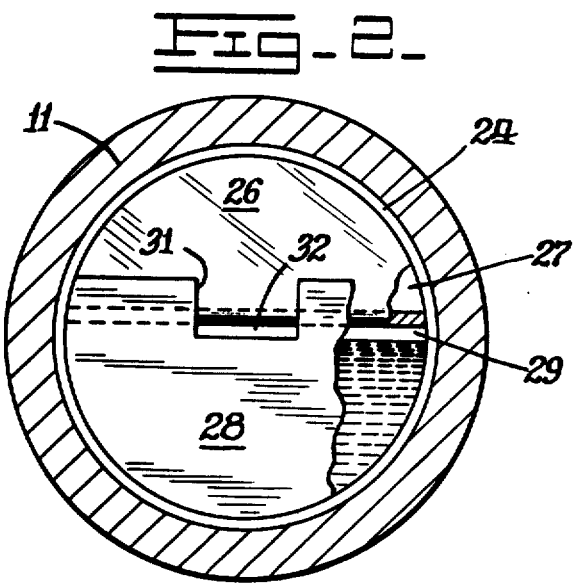
FIG. 2 is a sectional view of the cartridge, taken in the direction of arrows II—II in FIG. 1.

The partition means further comprises a flat, crescent-shaped plate 28 secured within the housing to have its upper edge overlap member 26 to form a second chamber portion 29 therein. An elongated slot or notch 31 is formed through plate 28 to provide means defining an opening 32 through the partition means (FIG. 2) on an inboard side of the housing for communicating liquid lubricant retained in the pre-filled second chamber portion exteriorly of the cartridge and to spline connection 13. An intermediate disc-shaped chamber 33 is defined between the cartridge and the outer end of shaft 12.

Upon installation of the cartridge on gear 11 as shown in FIG. 1, opening 32 is disposed approximately at the longitudinal center line or rotational axis X of the shaft and cartridge. Upon rotation and subsequent stopping of the shaft, the rotational disposition of chamber portion 29 will vary to insure a spilling-out of lubricant into chamber 33. The quantity of lubricant which periodically spills into chamber 33 will depend upon the rotational position of the shaft when it is stopped. Eventually sufficient lubricant will be transferred to the chamber 33 that upon subsequent rotation of the shaft, the lubricant in the chamber will form a torus due to centrifugal forces to thus cover the contacting surfaces of the spline connection. The lubricant remaining in chamber 29 provides a reserve supply to automatically replinish any lubricant lost from chamber 33 due to seepage past the seals.

From the above description it can be seen that spline connection 13 is continuously lubricated and is fully sealed to minimize its exposure to ambient which deters the formation of ferric oxide therein. The lubricating cartridge may be prefabricated in capsule form and pre-filled with a liquid lubricant prior to its installation on the gear to minimize costs and to facilitate servicing. The cartridge may comprise sheet metal stampings or molded plastic sheets suitably fabricated into capsule form.

What is claimed is:

1. A replaceable self discharging lubricating cartridge adapted for installation in the hollow end of a rotatable shaft or the like comprising a housing having an annular outer wall and an end wall secured to one end of said outer wall to define a chamber therein, first and second parition means secured to the other end of the annular outer wall of said housing to respectively separate said chamber into a closed first chamber portion and a substantially closed second chamber portion with said second chamber portion adapted to be at least partially filled with a liquid lubricant, and means defining an opening through said second partition means between said second chamber portion and the exterior of said housing through which the lubricant may pass, said first partition means comprising a crescent-shaped member, having an L-shaped cross section, secured to said housing and defining therewith said closed first chamber portion therein and said second partition means comprising a crescent-shaped plate secured to said housing and defining therewith said second chamber, said opening defined through said plate.

2. The lubricating cartridge of claim 1 wherein said opening constitutes an elongated slot located at a longitudinal axis of said cartridge.

3. The lubricating cartridge of claim 1 wherein said first chamber has a volume less than the volume of said second chamber.

* * * * *